(12) United States Patent
Tian et al.

(10) Patent No.: US 7,018,565 B2
(45) Date of Patent: Mar. 28, 2006

(54) EFFICIENT, SIZE-SELECTED GREEN-EMITTING PHOSPHORS

(75) Inventors: Yongchi Tian, Princeton, NJ (US); Diane Zaremba, Fairless Hills, PA (US); Perry Niel Yocom, Washington Crossing, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/792,572

(22) Filed: Mar. 3, 2004

(65) Prior Publication Data

US 2004/0217368 A1 Nov. 4, 2004

Related U.S. Application Data

(60) Provisional application No. 60/451,751, filed on Mar. 4, 2003.

(51) Int. Cl.
*C09K 11/56* (2006.01)
*C09K 11/62* (2006.01)

(52) U.S. Cl. ............... 252/301.4 S; 313/486; 313/503; 257/98; 257/E33.061

(58) Field of Classification Search ......... 252/301.4 S; 313/486
See application file for complete search history.

(56) References Cited

U.S. PATENT DOCUMENTS 6,544,438 B1 * 4/2003 Yocom et al. ............... 1/1

2002/0149001 A1 10/2002 Ellens et al.
2002/0190241 A1 12/2002 Le Mercier et al.

\* cited by examiner

*Primary Examiner*—C. Melissa Koslow
(74) *Attorney, Agent, or Firm*—William J. Burke

(57) ABSTRACT

Provided among other things is a method of forming a phosphor of the formula $$SrGa_2S_4:Eu:xGa_2S_3 \qquad (I)$$

wherein x is 0.0001 to 0.2, wherein a minor part of the europium component may be substituted with praseodymium in an efficiency enhancing amount, and wherein the median grain size of the phosphor composition is from 2 to 12 microns, the method comprising:
  precipitating $SrSO_4$ and $Eu(OH)_3$ under conditions selected as appropriate for achieving the desired average grain size in a product of the method;
  precipitating $Ga(OH)_3$ with product of the first precipitating step;
  at least once conducting the following two sub-steps:
    grinding the product of the second precipitating step or of a subsequent iteration of this step; and
    firing the ground product in hydrogen sulfide;
  at least once suspending the fired product in solvent in which it is not soluble and providing a period of time for a portion of the fired product to settle leaving a second portion suspended; and
  collecting the phosphor in one or more of the suspended or settled portions.

19 Claims, No Drawings

EFFICIENT, SIZE-SELECTED GREEN-EMITTING PHOSPHORS

This application claims the priority of Ser. No. 60/451,751, filed Mar. 4, 2003.

The present invention relates to size-selected, green-emitting phosphors.

Alkaline earth metal thiogallate phosphors activated with divalent europium are generally blue excited, green emitting phosphors. This type of phosphor can be used as an excellent color converter for LED devices such as white light devices.

One such phosphor is of stoichiometric formulation ($SrGa_2S_4$:Eu), and was disclosed in Peters, *Electrochem. Soc.*, vol. 119, 1972, p230. This phosphor has a low emission efficiency. Recently, a non-stoichiometric thiogallate-based phosphor of formula $SrGa_2S_4$:Eu:$xGa_2S_3$ was described in U.S. Pat. No. 6,544,438. This phosphor, designated STG, has emission efficiency as high as 90% or higher using a blue light excitation at about 470 nm.

In manufacturing the LED devices with the phosphor powder, typically a thin film of the particulate phosphor needs to be coated on a LED chip so that the phosphor efficiently absorbs the light out of the LED and re-emits light at longer wavelengths. The process of applying the phosphor powder onto LED chips involves a delivery of given amount of phosphor powders in fluid form, such as a liquid-based slurry or slurry in molten polymer. To manufacture large volumes of LED lamps, a precise and fast delivery of the phosphor slurry is important. Typically such processes require that the grains of the powder have a narrow range of size, typically a size distribution between 4 and 7 micron, or a smaller, narrow range. The grains in this size range are suitable for ink-jet application.

It has been found that the emission efficiency is dependent on grain size. The larger grains tend to emit more efficiently than the smaller ones. The most efficient STG phosphors typically have median grains sizes between 5 and 9 micron, and the STG grains smaller than 2 micron (median) often do not possess acceptable emission efficiency. It is now found that higher efficiency can be achieved in smaller grains by controlling the size of the particles that comprise the grains. High efficiency STG grains with median grain sizes from 2 to 5 microns can be isolated with the methods of the invention.

SUMMARY OF THE INVENTION

Provided in one embodiment is a phosphor of the formula $$SrGa_2S_4:Eu:xGa_2S_3 \quad (I)$$

wherein x is 0.0001 to 0.2, and wherein a minor part of the europium component is substituted with praseodymium in an efficiency enhancing amount.

Provided in one embodiment is a composition of a phosphor of the formula $$SrGa_2S_4:Eu:xGa_2S_3 \quad (I)$$

wherein x is 0.0001 to 0.2, wherein a minor part of the europium component may be substituted with praseodymium in an efficiency enhancing amount, wherein the median grain size of the phosphor composition is from 2 to 4.5 microns, and wherein the quantum efficiency of the phosphor composition is 85% or more.

Provided in another embodiment is a method of forming a phosphor of the formula $$SrGa_2S_4:Eu:xGa_2S_3 \quad (I)$$

wherein x is 0.0001 to 0.2, wherein a minor part of the europium component may be substituted with praseodymium in an efficiency enhancing amount, and wherein the median grain size of the phosphor composition is from 2 to 12 microns, the method comprising:

precipitating $SrSO_4$ and $Eu(OH)_3$ under conditions selected as appropriate for achieving the desired average grain size in a product of the method (such achievement measured after the settling step(s));

precipitating $Ga(OH)_3$ with product of the first precipitating step;

at least once conducting the following two sub-steps:
grinding the product of the second precipitating step or of a subsequent iteration of this step; and
firing the ground product in hydrogen sulfide;

at least once suspending the fired product in solvent in which it is not soluble and providing a period of time for a portion of the fired product to settle leaving a second portion suspended; and collecting the phosphor in one or more of the suspended or settled portions.

The first precipitating can be, for example, conducted in an aqueous organic solution having lower polarity than water. Or (or additionally), the first precipitating can be conducted in an aqueous solution containing a surfactant.

Additionally provided in an embodiment is a light emitting device comprising:
a light output;
a light source; and
a wavelength transformer located between the light source and the light output, comprising $SrGa_2S_4$:Eu:$xGa_2S_3$ wherein x is 0.0001 to 0.2, and wherein a minor part of the europium component is substituted with praseodymium in an efficiency enhancing amount, the wavelength transformer effective to increase the light at the light output having wavelength from 492 nm to 577 nm.

Also provided in an embodiment is a light emitting device comprising:
a light output;
a light source; and
a wavelength transformer located between the light source and the light output, comprising $SrGa_2S_4$:Eu:$xGa_2S_3$ wherein x is 0.0001 to 0.2, wherein a minor part of the europium component may be substituted with praseodymium in an efficiency enhancing amount, wherein the median grain size of the phosphor composition is from 2 to 4.5 microns, and wherein the quantum efficiency of the phosphor composition is 85% or more, the wavelength transformer effective to increase the light at the light output having wavelength from 492 nm to 577 nm.

DETAILED DESCRIPTION OF THE INVENTION

The following terms shall have, for the purposes of this application, the respective meanings set forth below.

Grains

Grains may be single crystals or agglomerations of single-crystal-like components of a phosphor.

Particles

Particles are single crystals or the single-crystal-like components of a phosphor.

The method of the invention comprises a first phosphor-forming process and a second sizing process.

The forming process can comprise, for example, the following steps:

1. Forming a solution (such as in dilute nitric acid) of a soluble strontium salt (such as the nitrate) and a soluble divalent europium salt (such as the nitrate). Optionally, a small amount of divalent praseodymium is added as a soluble salt or mineral (such as $Pr_6O_{11}$).
2. Sufficiently neutralizing the strontium/europium solution (such as neutralizing with ammonium hydroxide) concurrently with adding a sulfate source (such as sulfuric acid or ammonium sulfate). Concurrently in this context means sufficiently in conjunction to achieve the desired precipitation. The strontium is believed to form the sulfate, and together with neutralization, produces the following precipitation:

   $Sr(SO_4)+Eu(NO_3)_3+NH_4OH \rightarrow SrSO_4\downarrow+Eu(OH)_3\downarrow+NH_4OH$.

The form of the precipitate is believed to be strontium sulfate particles coated with europium hydroxide. In this precipitation step, the size of the particles within the grains can be adjusted with certain parameters of the precipitation. For example, adding organic solvents to the aqueous medium, such as acetone or ethanol, decreases the polarity of the solvent and leads to a fine powder with smaller particles. Dispersing organic surfactants such as sorbitan monolaurate in the aqueous medium results in very fine particle precipitation. It is believed that smaller particle size allows for high efficiency in smaller grains. Such efficient smaller grain can to be achieved with the processes of the invention.
3. Forming a second solution of an acid-soluble gallium salt, such as the nitrate. For example, metallic gallium can be dissolved in nitric acid (e.g., overnight). As gallium oxide is difficult to convert to the sulfide, its use is less favored.
4. A second precipitation is conducted after mixing a suspension of the first Sr/Eu precipitate with the gallium solution; the gallium solution added to provide an excess x of gallium as in the following formula:

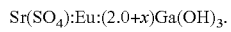
   $Sr(SO_4):Eu:(2.0+x)Ga(OH)_3$.

The precipitation is conducted by sufficiently neutralizing (e.g., with ammonia) or adding a chaotrophic agent (such as urea).
5. A fine powder resulting from the second precipitation is dried, ground and fired in hydrogen sulfide. The firing can be in a refractory boat (such as an alumina boat) in a tube furnace. Suitable firing can be, for example, 800 degrees C. for 5 hours. A second grinding and firing under hydrogen sulfide step can be applied to assure uniformity. A suitable second firing can be, for example, 900 degrees C. for 2 hours. X-ray analysis can be used to determine x, as "x" is used in Formula (I).

Water-miscible (including miscible in the aqueous solvent as finally composed for the Sr/Eu precipitation) solvents for use in the precipitation include, for example, alcohols and ketones.

Neutralizations described herein do not have to be to pH 7, but only sufficiently more neutral (or somewhat basic) to allow the precipitation in question. Temperatures described herein for processes involving a substantial gas phase are of the oven or other reaction vessel in question, not of the reactants per se.

In certain embodiments, the range of x is from one of the following lower endpoints (inclusive) or from one of the following upper endpoints (inclusive). The lower endpoints are 0.0001, 0.001, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18 and 0.19. The upper end points are 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19 and 0.2. For example, the range can be 0.001 to 0.2 or 0.001 to 0.1.

When praseodymium is present in the composition, praseodymium substitutes for a minor amount of europium, which amount is effective to enhance the quantum efficiency of the phosphor. The amount is for example 0.05 mol percent to 4 mol percent of europium. In certain embodiments, the range of this percentage is from one of the following lower endpoints (inclusive) or from one of the following upper endpoints (inclusive). The lower endpoints are 0.05, 0.1, 0.2, 0.3, 0.4, 0.5, 0.6, 0.7, 0.8, 0.9, 1.0, 1.2, 1.4, 1.6, 1.8, 2.0, 3.2, 3.4, 3.6 and 3.8 mol percent. The upper endpoints are 0.1, 0.2, 0.3, 0.4, 0.5, 0.6, 0.7, 0.8, 0.9, 1.0, 1.2, 1.4, 1.6, 1.8, 2.0, 3.2, 3.4, 3.6, 3.8 and 4.0 mol percent.

In certain embodiments, the range of the median size is from one of the following lower endpoints (inclusive) or from one of the following upper endpoints (inclusive). The lower endpoints are 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0 and 11.5. The upper endpoints are 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5 and 12.0.

In certain embodiments, the range of the wavelength of light enhanced by the wavelength transformer is from one of the following lower endpoints (inclusive) or from one of the following upper endpoints (inclusive). The lower endpoints are 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 56, 562, 563, 564, 565, 566, 567, 568, 569, 570, 571, 572, 543, 574, 575 and 576. The upper endpoints are 493, 494, 495, 496, 497, 498, 499, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 56, 562, 563, 564, 565, 566, 567, 568, 569, 570, 571, 572, 543, 574, 575, 576 and 577.

In certain embodiments, quantum efficiency of the phosphor is 85%, 86%, 87%, 88%, 89% or more.

The following examples further illustrate the present invention, but of course, should not be construed as in any way limiting its scope.

EXAMPLE 1

Phosphor Formation without Modifier

The steps for one exemplification of the phosphor-forming process were:

1. Preparation of $Eu_3+/Sr_2+$ solution: 1.408 gram of $Eu_2O_3$ was dissolved in 200 mL dilute nitric acid. 28.34 gram of $SrCO_3$ was slowly added into the solution. Nitric acid was added as necessary. 0.6 mL of 0.01 M $Pr_6O_{11}$ solution was added to this system. Deionized water was added to make 300 mL.

2. Preparation of sulfate solution: 60 gram of $(NH_4)_2SO_4$ was dissolved in 270 mL deionized water for a 300 mL solution.
3. Precipitation of $SrSO_4$ fine powders: The sulfate solution prepared in step 2 was added into the solution of step 1 while stirring for ten minutes, resulting in the formation of a $SrSO_4$ fine powder. The pH was adjusted to pH 2.2.
4. Preparation of Ga solution: 28.72 gram of gallium metal was dissolved in 200 mL concentrated nitric acid. The solution was warmed until the nitric acid fumed (and the preparation turns to brownish). The solution was cooled to room temperature and set overnight. After this overnight setting, the solution was clear greenish. The solution was heated until it turned yellow and then clear. Deionized water was added to make a 500 mL solution. The pH was adjusted to pH 2.02 with ammonium hydroxide (approximately 40 mL), and then deionized water was added to 600 mL.
5. Precipitation of $Ga(OH)_3$: The Ga solution prepared in step 4 was added to the suspension from step 3, and the pH adjusted to pH 7.0. The suspension was stirred for 17 hours at room temperature, then set for two hours. A product of white fine powder was filtered out.
6. The powder was rinsed with acetone, then stirred with 1400 mL acetone for 1 hour at 50° C. prior to another filtration to recover the powder. The powder was dried.
7. The powder was ball milled for 5 hours, filtered and dried overnight.
8. The powder was fired at 800° C. for 5 hours in $H_2S$ gas. After being cooled down to room temperature, the powder was ground (can be ball milled) for 40 minutes.
9. The phosphor was again fired at 900° C. for 2 hours in $H_2S$ gas.

The X-ray powder diffraction data of this sample showed the co-existence of two crystalline phases, one is $SrGa_2S_4$, and the other is $Ga_2S_3$. The grain size was measured on a Horiba CAPA-700 Grain Analyzer to be between 1 and 8.5 micron with a median size of 4.66 micron. The quantum efficiency was measured at 89% using the emission band at 537 nm with 450 nm excitation.

EXAMPLE 2

Phosphor Formation with Organic Modifier

The steps for one exemplification of the phosphor-forming process were:
1. Preparation of Eu3+/Sr2+ solution: 2.815 gram of $Eu_2O_3$ was dissolved in 400 mL dilute nitric acid. 56.69 gram of $SrCO_3$ was slowly added into the solution. Additional nitric acid was added as necessary. 1.2 mL of 0.01 M $Pr_6O_{11}$ solution was added to this system. Deionized water was added to make a 600 mL solution. Then 600 mL ethyl alcohol was added to make 1200 mL.
2. Preparation of sulfuric acid solution: 50 mL 97% concentrated sulfuric acid was diluted in 300 mL deionized water.
3. Precipitation of $SrSO_4$ fine powders: The sulfuric acid solution prepared in step 2 was added into the Eu3+/Sr2+ solution made in step 1 while stirring for ten minutes, resulting in a $SrSO_4$ fine powder. The pH was adjusted to pH 1.3.
4. Preparation of Ga solution: 57.17 grams of metal gallium was dissolved in 400 mL concentrated nitric acid. The solution was warmed until the nitric acid fumed (turned brownish). After the solution was cooled to room temperature and set overnight, the solution was transparent greenish. The solution was heated until it turned yellow and then clear. Deionized water was added to make a 1000 mL solution. The pH was adjusted to pH 1.2 with ammonium hydroxide (approximately 80 mL), then deionized water was added to 1200 mL.
5. The Ga solution made in step 4 was added to the suspension obtained in step 3 while vigorously stirring. Ethyl alcohol was added to the suspension to a total volume of 3.4 L. The pH was adjusted to pH7.0. The suspension was stirred for two hours and then allowed to settle overnight. The supernatant was decanted and the powder filtered out. The powder was rinsed with acetone several times. The powder was dried at 55° C. overnight.
6. The powder was ball milled in acetone with alumina balls for 5 hours, then filtered and dried overnight.
7. The powder was fired precursor at 800° C. for 5 hour in $H_2S$. The fired phosphor product was ground.
8. The phosphor was again fired at 900° C. for 1 hour in $H_2S$.

The X-ray powder diffraction data of this phosphor sample showed the co-existence of two crystalline phases, one was $SrGa_2S_4$, and the other $Ga_2S_3$. The grain size was measured on a Horiba CAPA-700 Grain Analyzer to be between 1 and 7 micron with median size of 3.40 micron. The quantum efficiency was 90% using the emission band at 537 nm with 450 nm excitation.

EXAMPLE 3

With Surfactant Modifier

The steps for one exemplification of the phosphor-forming process were:
1. Preparation of Eu3+/Sr2+ solution: 2.815 gram of $Eu_2O_3$ was dissolved in 400 mL dilute nitric acid. 56.69 gram of $SrCO_3$ was slowly added into the solution. Additional nitric acid was added as necessary. 1.2 mL of 0.01 M $Pr_6O_{11}$ solution was added to this system. Deionized water was added to make 600 mL. 2 wt % sorbitan monolaurate of the $SrCO_3$ weight (1.4 mL) was added. Then, 600 ethyl alcohol was added to make a 1200 mL.
2. Preparation of sulfate solution: 120 gram of $(NH_4)_2SO_4$ was dissolved in 540 mL deionized water for a 600 mL solution.
3. Precipitation of $SrSO_4$ fine powders: The sulfate solution prepared in step 2 was added into the solution of step 1 while stirring for ten minutes, which resulted in the formation of $SrSO_4$ fine powder. The pH was adjusted to pH 1.75.
4. Preparation of Ga solution: 57.54 gram of gallium metal was dissolved in 400 mL concentrated nitric acid. The solution was warmed until the nitric acid fumed (turned to brownish). The solution was cooled to room temperature and set overnight. After this setting, the solution was clear greenish. The solution was heated until it turned yellow and then clear. Deionized water was added to make a 1000 mL. The pH was adjusted to pH 2.02 with ammonium hydroxide (approximately 80 mL). Then deionized water was added to 1200 mL.
5. Precipitation of $Ga(OH)_3$: The Ga solution prepared in step 4 was added into the suspension from step 3, and the pH adjusted to pH 7.0. The suspension was stirred for 2 hours at room temperature, then set for 15 hours. A white colored fine powder was recovered by filtration.
6. The powder was rinsed with acetone, filtered, stirred with 1400 mL acetone for 1 hour at 50° C., and filtered again. The powder was dried.
7. The powder was ball milled for 12 hours.
8. The powder was fired at 800° C. for 5 hours in H$_2$S gas. After being cooled to room temperature, the powder was ground (or can be ball milled) for 40 minutes.
9. The phosphor was again fired at 900° C. for 2 hours in H$_2$S gas.

The X-ray powder diffraction data of this phosphor sample showed the co-existence of two crystalline phases, one is SrGa$_2$S$_4$, and the other is Ga$_2$S$_3$. The grain size was measured on a Horiba CAPA-700 Grain Analyzer to be between 1 and 12 micron with median size of 6.8 micron. The quantum efficiency was measured as 88% using the emission band at 537 nm with 450 nm excitation.

EXAMPLE 4

Sizing

The steps for one exemplification of the sizing process were:
1. Preparation of ethyl alcohol suspension of STG phosphor: 135 grams of STG phosphor powder was suspended in 450 mL ethyl alcohol. The powder had grain size ranging from 1 to 14 micron with a median of 7.6 micron.
2. The suspension was sonicated for 12 minutes.
3. The suspension was allowed to settle for 30 minutes. A portion of the powder settled while another portion of the powder remained suspended.
4. The suspension was transferred to another container, while the settled portion was isolated as a larger-sized portion.
5. Repeat steps 3–4 to obtain a intermediate sized portion (second settled portion) and a smallest portion (second supernate).

The grain sizes of the three samples were measured on a Horiba CAPA-700 Grain Analyzer. The large sized part: median size 7.74 micron, 84 grams, quantum efficiency 91%; the intermediate size portion: 4.58 micron, quantum efficiency 87%; and the small size portion: 2.67 micron, quantum efficiency 92%.

EXAMPLE 5

Ball-Milling Post Firing

A weighed amount of STG phosphor with median particle size of 10.5 micron is suspended in acetone. The suspension is then placed into an alumina milling jar containing ¼ inch (0.635 cm) glass balls. Milling then proceeded for 40 minutes. After milling, the powder was dried at 55° C. The particles size was measured to be 7.2 micron (median). The quantum efficiency of the milled sample was 39%, while the quantum efficiency of the unmilled sample was 91%. Annealing of the milled phosphor at 500° C. for 2 hours recovered partly the emission efficiency to 45%.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:
1. A phosphor of the formula

$$SrGa_2S_4{:}Eu{:}xGa_2S_3 \qquad (I)$$

wherein x is greater than 0.07 up to 0.2, and wherein 0.05 mol percent to 4 mol percent of the europium component is substituted with praseodymium, providing an efficiency enhancing amount.

2. The phosphor of claim 1, wherein x is 0.08 to 0.2.
3. The phosphor of claim 1, wherein x is 0.09 to 0.2.
4. A composition of a phosphor of the formula $$SrGa_2S_4{:}Eu{:}xGa_2S_3 \qquad (I)$$

wherein x is 0.0001 to 0.2, wherein a minor part of the europium component may be substituted with praseodymium in an efficiency enhancing amount, wherein the median grain size of the phosphor composition is from 2 to 4.5 microns, and wherein the quantum efficiency of the phosphor composition is 85% or more.

5. The composition of claim 4, wherein the median grain size is from 2 to 3.5 microns.
6. The composition of claim 5, wherein the median grain size is from 2 to 3 microns.
7. The composition of claim 4, wherein the quantum efficiency of the phosphor composition is 87% or more.
8. The composition of claim 6, wherein the quantum efficiency of the phosphor composition is 88% or more.
9. The composition of claim 6, wherein the quantum efficiency of the phosphor composition is 89% or more.
10. A method of forming a phosphor of the formula $$SrGa_2S_4{:}Eu{:}xGa_2S_3 \qquad (I)$$

wherein x is 0.0001 to 0.2, wherein a minor part of the europium component may be substituted with praseodymium in an efficiency enhancing amount, and wherein the median grain size of the phosphor composition is from 2 to 12 microns, the method comprising:
precipitating SrSO$_4$, Eu(OH)$_3$ and Pr(OH)$_3$ under conditions selected as appropriate for achieving the desired average grain size in a product of the method;
precipitating Ga(OH)$_3$ with product of the first precipitating step;
at least once conducting the following two sub-steps:
grinding the product of the second precipitating step or of a subsequent iteration of this step; and
firing the ground product in hydrogen sulfide;
at least once suspending the fired product in solvent in which it is not soluble and providing a period of time for a portion of the fired product to settle leaving a second portion suspended; and
collecting the phosphor in one or more of the suspended or settled portions.

11. The method of claim 10, wherein the collected phosphor composition has a quantum efficiency of 85% or more.

12. The method of claim 10, wherein the first precipitating is conducted in an aqueous organic solution having lower polarity than water.

13. The method of claim 10, wherein the first precipitating is conducted in an aqueous solution containing a surfactant.

14. A light emitting device comprising:
an LED light source that produces a light output; and
a wavelength transformer comprising $SrGa_2S_4$:Eu:$xGa_2S_3$ wherein x is 0.0001 to 0.2, and wherein a minor part of the europium component is substituted with praseodymium in an efficiency enhancing amount, the wavelength transformer effective to, and located to, increase the light output having wavelength from 492 nm to 577 nm.

15. A light emitting device comprising:
an LED light source that produces a light output; and
a wavelength transformer comprising $SrGa_2S_4$:Eu:$xGa_2S_3$ wherein x is 0.0001 to 0.2, wherein a minor part of the europium component may be substituted with praseodymium in an efficiency enhancing amount, wherein the median grain size of the phosphor composition is from 2 to 4.5 microns, and wherein the quantum efficiency of the phosphor composition is 85% or more, the wavelength transformer effective to and located to, increase the light output having wavelength from 492 nm to 577 nm.

16. A light emitting device according to claim 15, wherein 0.05 mol percent to 4 mol percent of the europium component is substituted with praseodymium.

17. A light emitting device according to claim 14, wherein 0.05 mol percent to 4 mol percent of the europium component is substituted with praseodymium.

18. The composition of claim 1, wherein the phosphor grains are of median grain size 2 to 3.5 microns.

19. A composition of a phosphor of the formula $$SrGa_2S_4\text{:Eu:}xGa_2S_3 \quad (I)$$

wherein x is greater than 0.07 up to 0.2, wherein 0.05 mol percent to 4 mol percent of the europium component is substituted with praseodymium, and wherein the median grain size of the phosphor composition is from 2 to 4.5 microns.

* * * * *